United States Patent [19]

Ohtani et al.

[11] Patent Number: 5,324,815

[45] Date of Patent: Jun. 28, 1994

[54] PROCESS FOR PRODUCING ELECTRICALLY CONDUCTIVE ORGANIC POLYMER

[75] Inventors: Akira Ohtani; Masao Abe; Yoshihiro Uetani; Keisuike Kii, all of Osaka, Japan

[73] Assignee: Nitto Denko Corporation, Osaka, Japan

[21] Appl. No.: 989,147

[22] Filed: Dec. 11, 1992

[30] Foreign Application Priority Data

Dec. 11, 1991 [JP] Japan .................. 3-327605
Sep. 30, 1992 [JP] Japan .................. 4-261577

[51] Int. Cl.$^5$ .................. C08G 73/00; C08J 3/00; H01B 1/00; C08F 6/00
[52] U.S. Cl. .................. 528/422; 528/486; 528/487; 528/488; 528/490; 528/491; 528/502; 528/503; 252/500; 525/383; 525/386; 525/540
[58] Field of Search .................. 252/500; 525/540, 383, 525/386; 528/422, 486, 487, 488, 490, 491, 502, 503

[56] References Cited

U.S. PATENT DOCUMENTS

| | | | |
|---|---|---|---|
| 4,585,581 | 4/1986 | Skotheim | 252/500 |
| 4,615,829 | 10/1986 | Tamura et al. | 252/500 |
| 4,803,096 | 2/1989 | Kuhn et al. | 252/500 |
| 5,176,851 | 1/1993 | Barry, Jr. | 528/491 |
| 5,187,034 | 2/1993 | Otagawa et al. | 429/198 |
| 5,264,552 | 11/1993 | Abe et al. | 528/422 |

FOREIGN PATENT DOCUMENTS 60-133027 7/1985 Japan.
328229 2/1991 Japan.
352929 3/1991 Japan.

OTHER PUBLICATIONS

"Polyanilines: A Novel Class of Conducting Polymers", *Faraday Discuss. Chem. Soc.*, 88, p. 317, 1989.

*Primary Examiner*—Paul R. Michl
*Assistant Examiner*—Tae H. Yoon
*Attorney, Agent, or Firm*—Sughrue, Mion, Zinn, Macpeak & Seas

[57] ABSTRACT

A process for producing an electrically conductive organic polymer, which comprises subjecting an organic polymer having an imino-p-phenylene structural unit represented by the following formula

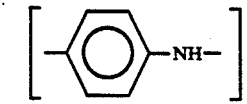

as the main repeating unit to a doping treatment with a solution having dissolved therein a quinone series oxidizing agent together with a protonic acid.

15 Claims, No Drawings

PROCESS FOR PRODUCING ELECTRICALLY CONDUCTIVE ORGANIC POLYMER

FIELD OF THE INVENTION

The present invention relates to a process for producing an electrically conductive organic polymer.

BACKGROUND OF THE INVENTION

In general, an electrically conductive organic polymer called polyaniline is a polymer having a quinonediimine structural unit represented by the following formula as the main repeating unit

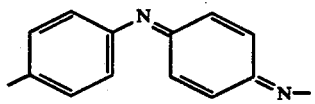

and which contains a dopant (U.S. Pat. No. 4,615,829). In more detail, the electrically conductive organic polymer is a quinonediimine.phenylenediamine type polyaniline having a quinonediimine structural unit and a phenylenediamine structural unit represented by the following formula as the main repeating units

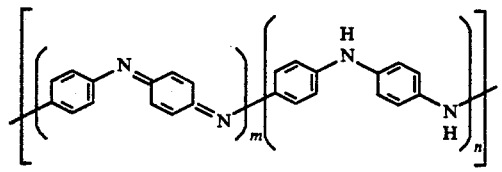

and which is doped with a protonic acid.

It is generally said that protonation of nitrogen atom in the quinonediimine structural unit in such a polyaniline is indispensable to exhibit the electrical conductivity.

In the above formula, m and n show molar fractions of the quinonediimine structural unit and the phenylenediamine structural unit," respectively, in the repeating unit, provided that $0<m<1$, $0<n<1$, and $m+n=1$.

A film comprising the electrically conductive polyaniline can be obtained by dissolving a solvent-soluble quinonediimine-phenylenediamine type polyaniline in a proper solvent, casting the solution followed by drying to form a film, and subjecting the film to a doping treatment (protonic acid doping) by immersing the film in an aqueous solution of a protonic acid as described in, e.g., JP-A-3-28229 (corresponding to U.S. patent application Ser. No. 07/413,502) (the term "JP-A" as used herein means an "unexamined published Japanese patent application").

Further, JP-A-3-52929 describes that an electrically conductive polyaniline film is obtained by dissolving an imino-p-phenylene type polyaniline having an imino-p-phenylene structural unit shown by the formula

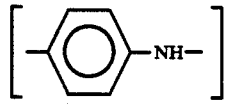

as the main repeating unit in a solvent, adding thereto a proper oxidizing agent, and casting the mixture to form the film. According to this process, the imino-p-phenylene type polyaniline is oxidized and converted into a quinonediimine-phenylenediamine type polyaniline. In this case, the polyaniline is also doped with the anion of the oxidizing agent. Since doping in this case is accompanied by an oxidation reaction, the doping is usually called oxidation doping.

As described above, in order that a polyaniline has an electrical conductivity, it is necessary that the polyaniline has both the quinonediimine structure and the phenylenediamine structure in the molecule and also it is necessary that the nitrogen in the quinonediimine structure is protonated (doped). However, hitherto, for doping with the protonic acid as above, a long time is usually required. The doping time differs according to the kind of the protonic acid used and the properties of the polyaniline film, such as the film thickness, porosity, etc., and in the polyaniline film having a thickness of about 20 μm, for imparting an electrical conductivity of at least 1 S/cm, it is required to immerse the film in an aqueous hydrochloric acid solution for several hours. When p-toluenesulfonic acid is used as the acid, several days are sometimes required. Requirement of such a long time for doping is disadvantageous for the industrial production of an electrically conductive polyaniline film.

On the other hand, it is described in JP-A-60-133027 and Faraday Discuss. Chem Soc., 88, 317(1989) that a quinonediimine-phenylenediamine type polyaniline can be obtained by subjecting the powder of an imino-p-phenylene type polyaniline to an oxidation doping treatment with an acetonitrile solution of ferric chloride or with hydrogen peroxide and a solution of an inorganic acid such as hydrochloric acid, sulfuric acid, phosphoric acid, etc.

Accordingly, oxidation doping can be also carried out by a process of first forming an imino-p-phenylene type polyaniline film by casting an imino-p-phenylene type polyaniline solution and then immersing the film in an aqueous solution of an oxidizing agent such as ferric chloride, etc., in place of the above-described process of forming the film after adding the oxidizing agent to the polyaniline solution. The oxidation doping is different from protonic acid doping in the point that an oxidation reaction is accompanied In general, oxidation doping has an advantage that the required time may be short as compared with protonic acid doping but on the other hand, since, for example, when an oxidizing agent such as ferric chloride is used, hydrogen chloride is a dopant and when a combination of hydrogen peroxide and methanesulfonic acid is used, methanesulfonic acid is a dopant, there is a problem in the stability of the electrical conductivity after doping the polyaniline film. Further, when hydrogen peroxide is used as an oxidizing agent, there is the problem in that the mechanical strength of the polyaniline film is decreased by the doping treatment.

SUMMARY OF THE INVENTION

As the result of various investigations to overcome the above-described problems in conventional doping of polyaniline, it has been found that by using a combination of a specific oxidizing agent and a protonic acid, the imino-p-phenylene type polyaniline can be quickly doped and also by doping the polyaniline as described above, a polyaniline excellent in the stability of the electrical conductivity and in the mechanical strength of the film can be obtained. Thus, present invention has been attained based on the finding.

Accordingly, an object of the present invention is to provide a process for producing an electrically conductive organic polymer.

The process for producing an electrically conductive organic polymer according to the present invention comprises treating an organic polymer having an imino-p-phenylene structural unit represented by the following formula (I)

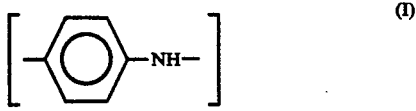

as a main repeating unit with a solution having dissolved therein a quinone series oxidizing agent together with a protonic acid.

DETAILED DESCRIPTION OF THE INVENTION

The polyaniline used in the present invention is an organic polymer which has the imino-p-phenylene structural unit represented by the formula (I) as the main repeating unit and is soluble in an organic solvent in the undoped state. According to the present invention, in view of the strength, etc., of the electrically conductive polyaniline film, it is preferred that the intrinsic viscosity $[\eta]$ of the imino-p-phenylene type polyaniline measured at 30° C. be at least 0.40 dl/g.

Such a polyaniline can be obtained by reducing an organic polymer having a quinonediimine structural unit and a phenylenediamine structural unit represented by the following formula (II)

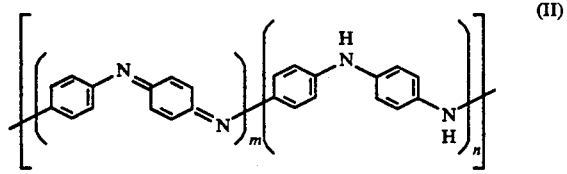

wherein m and n each represents a molar fraction of the quinonediimine structural unit and the phenylenediamine structural unit, respectively, in the repeating units, provided that $0 < m < 1$, $0 < n < 1$, and $m+n=1$, as the main repeating units and soluble in an organic solvent in a undoped state with a reducing agent as described in detail in JP-A-3-52929.

As the reducing agent, hydrazine compounds such as phenylhydrazine, hydrazine, hydrazine hydrate, hydrazine sulfate, hydrazine hydrochloride, etc., and reducing metal hydride compounds such as lithium aluminumhydride, lithium borohydride, etc., are suitably used. In these reducing agents, hydrazine hydrate or phenylhydrazine is particularly preferably used as the reducing agent since they do not form residues after the reduction reaction.

In the process of the present invention, a quinone series oxidizing agent is used together with a protonic acid. Specific examples of the quinone series oxidizing agent are p-benzoquinone, o-benzoquinone, p-toluquinone, oxy-p-benzoquinone, 1,2-naphthoquinone, 1,4-naphthoquinone, diphenoquinone, stilbenequinone, chloranil, 2,3-dichloro-5,6-dicyano-p-benzoquinone, sodium 1,2-naphthoquinone-4-sulfonate, sodium 1,4-naphthoquinone-2sulfonate, and tetrafluoro-p-benzoquinone.

By using the quinone series oxidizing agent as an oxidizing agent according to the present invention, a practically usable electrically conductive polyaniline film showing less lowering of the mechanical strength of the polyaniline film by oxidation doping can be obtained.

As the protonic acid used in the process of the present invention, various organic acids can be used in addition to inorganic acids such as hydrochloric acid, sulfuric acid, perchloric acid, phosphoric acid, boro-fluoric acid, and the like.

As such organic acids, aliphatic, aroaliphatic or cyclic mono- or poly-basic acids may be used and these organic acids may have a hydroxy group, a halogen atom, a nitro group, a cyano group, an amino group, etc.

Examples of such organic acids are acetic acid, n-butyric acid, pentadecafluorooctanoic acid, pentafluoro-acetic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, p-chorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, Thymol Blue, salicylic acid, 5-aminosalicylic acid, o-methoxy-benzoic acid, 1,6-dinitro-4-chlorophenol, 2,6-dinitro-phenol, 2,4-dinitrophenol, p-oxybenzoic acid, bromophenol blue, mandelic acid, phthalic acid, isophthalic acid, maleic acid, fumaric acid, malonic acid, tartaric acid, citric acid, lactic acid, succinic acid, α-alanine, β-alanine, glycine, glycolic acid, thioglycolic acid, ethylenediamine-N,N'-diacetic acid, and ethylenediamine-N,N,N',N'-tetraacetic acid.

The organic acid may have a sulfonic acid group or a sulfuric acid ester group. Examples of the organic acid are aminonaphtholsulfonic acid, metanilic acid, sulfanilic acid, allylsulfonic acid, laurylsulfuric acid, xylenesulfonic acid, chlorobenzenesuLfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, alkyl-naphthalenesulfonic acid, etc.

The protonic acids which can be preferably used in the present invention are polyvalent organic sulfonic acids having 2 or more sulfonic acid groups in the molecule. Examples of such polyvalent organic sulfonic acids are ethanedisulfonic acid, propanedisulfonic acid, butanedisulfonic acid, pentanedisulfonic acid, hexanedisulfonic acid, heptanedisulfonic acid, pentanedisulfonic acid, hexanedisulfonic acid, heptanedisulfonic acid, octanedisulfonic acid, nonanedisulfonic acid, decanedisulfonic acid, benzenedisulfonic acid, naphthalenedisulfonic acid, naphthalenetrisulfonic acid, naphthalenetetrasulfonic acid, anthracenedisulfonic acid, anthraquinonedisulfonic acid, phenanthrenedisulfonic acid, fluorenonedisulfonic acid, carbazoldisulfonic acid, diphenylmethanedisulfonic acid, biphenyldisulfonic acid, terphenyldisulfonic acid, terphenyltrisulfonic acid, a naphthalenesulfonic acid-formalin condensation product, a phenanthorenesulfonic acid-formalin condensation product, an anthracenesulfonic acid-formalin condensation product, a fluorenesulfonic acid-formalin condensation product, and a carbazolesulfonic acid-formalin condensation product, etc. The position of the sulfonic acid group in the aromatic ring is optional. In these polyvalent organic acids, organic disulfonic acids are particularly preferably used in the present invention.

Further, the organic acid used in the present invention may be a polymer acid. Examples of such a polymer acid are polyvinylsulfonic acid, polyvinylsulfuric acid, polystyrenesulfonic acid, a sulfonated styrene-butadiene copolymer, polyisoprenesulfonic acid, polyallyl-sulfonic acid, polymetallylsulfonic acid, polysulfopropyl acrylate, poly-2-acrylamido-2-methylpropanesulfonic acid, and halogenated polyacrylic acid.

Sulfonated polyaniline and the fluorine-containing polymer known as Nafion (registered trade mark, made by E.I. Du Pont de Nemours and Company) are also suitably used as the polymer acid.

Use of the organic polyvalent sulfonic acid such as the organic disulfonic acids and the polymer acids as the protonic acid according to the present invention can provide an electrically conductive polyaniline film having excellent heat resistance and water resistance.

According to the process of the present invention, the quinone series oxidizing agent and the protonic acid as described above are dissolved in a suitable solvent to prepare a doping liquid and by contacting the imino-p-phenylene type polyaniline with the doping liquid, the polyaniline is doped.

There is no particular restriction on the solvent used in the doping step if the solvent can dissolve both the protonic acid and the oxidizing agent. For example, an organic polar solvent such as ethanol, N-methyl-2-pyrro-lidone, N,N-dimethylformamide, N-methylformamide, form-amide, N,N-dimethylacetamide, dimethyl sulfoxide, etc., water, or a mixed solvent thereof is preferably used.

In particular, the mixed solvent of water and the organic solvent is preferred from the points of improving the solubility of the protonic acid and the oxidizing agent and improving the doping speed. Examples of such a mixed solvent are water/ethanol, water/N-methylformamide, and water/N-methyl-2-pyrrolidone.

In such a mixed solvent of water and the organic solvent, the mixing ratio of water and the organic solvent is properly selected according to the kinds of the protonic acid and the oxidizing agent used. For example, in the case of preparing a water/ethanol solution for 1,2-ethanedisulfonic acid and p-benzoquinone, the mixed solvent having a water content of from about 20 to 90% by weight is preferably used.

The concentration of the doping liquid is properly selected according to the temperature of the doping treatment, the thickness of the polyaniline film, the electrical conductivity of the desired electrically conductive polyaniline, etc., but it is generally-preferred that the concentration of the protonic acid is in the range of from 1 to 30% by weight and the concentration of the oxidizing agent is in the range of from 0.5 to 20% by weight.

There is no particular restriction on the concentration ratio of the protonic acid and the oxidizing agent if doping is performed, but it is generally preferred that the ratio of protonic acid/oxidizing agent is in the range of from 1/100 to 100/1 by molar ratio. In general, as the solute concentration of the doping liquid is higher, the time required for the doping treatment may be shorter.

Also, the temperature for the doping treatment is usually in the range of from 10° to 40° C. but if necessary, by carrying out the doping treatment at a temperature higher than 40° C., the time required for the doping treatment can be shortened.

According to the process of the present invention, the doping treatment is carried out by contacting the polyaniline film with the above-described doping liquid. More practically, the doping treatment is carried out by immersing the polyaniline film in the doping liquid, if necessary, with stirring, or coating the polyaniline film with the doping liquid, or spraying the doping liquid onto the polyaniline film.

In the present invention, it is preferable that after such a doping treatment, the doping liquid be removed from the polyaniline film by washing with a suitable solvent such as ethanol, etc., followed by drying. This is because if the doping liquid remains in the polyaniline film, it sometimes happens that the doping liquid gives a bad influence on the electrical conductivity of the electrically conductive polyaniline film obtained. In this case, since a basic solvent containing water has a danger of undoping the protonic acid used for doping the polyaniline film, the use of such a solvent for washing shall be avoided. Ultrasonic washing is one of effective washing methods.

According to the process of the present invention, a polyaniline film can be doped in a short period of time and also the electrically conductive polyaniline film obtained is excellent in the stability of the electrical conductivity and the mechanical strength of the film.

The present invention is further described in more detail by reference to the following examples and reference examples but the present invention is not limited by these examples in any way. All parts, percents, ratios and the like are by weight unless otherwise indicated.

REFERENCE EXAMPLE 1

Production of quinonediimine - phenylenediamine type electrically conductive polyaniline in a doped state by the oxidative polymerization of aniline:

In a 10 liter separable flask equipped with a stirrer, a thermometer, and straight-tube adapter were charged 6,000 g of distilled water, 360 ml of 36% hydro-chloric acid, and 400 g ( 4. 295 moles ) of aniline in this order, and aniline was dissolved.

Apart from this, 434 g (4,295 moles) of 97% concentrated sulfuric acid was added to 1,493 g of distilled water in a beaker while cooling with ice-water followed by mixing to prepare an aqueous sulfuric acid solution. The aqueous sulfuric acid solution was added to the above-obtained mixture in the separable flask and the whole flask was cooled to −4° C. in a low temperature bath kept at −6° C.

Further, apart from the above steps, 980 g (4.295 moles) of ammonium peroxodisulfate was added to 2,293 g of distilled water in a beaker and dissolved therein to prepare an aqueous oxidizing agent solution.

The whole flask was continued to cool in a low temperature bath and the above aqueous solution of ammonium peroxodisulfate was added dropwise gradually to the acidic aqueous solution of the aniline salt in the flask through the straight-tube adapter using a tubing pump at a dropping rate of 1 ml/minute or less with stirring while keeping the reaction mixture formed at a temperature of −3° C. or lower. First, the colorless transparent solution became from greenish blue to blackish green with the progress of the polymerization, and then a blackish green powder was deposited.

At the deposition of the powder, the temperature of the reaction mixture was increased but for obtaining a high molecular weight polymer, it is necessary that the temperature of reaction system is kept at a temperature of 0° C. or lower, preferably −3° C. or lower. After depositing the powder, dropping rate of the aqueous ammonium peroxodi-sulfate may be increased a little to, for example, about 8 ml/minute. However, in this case, it is also necessary to control the dropping rate of the aqueous solution such that the temperature of the reaction system is kept at a temperature of −3° C. or lower.

Thus, after finishing the addition of the aqueous solution of anlmonium peroxodisulfate over a period of 7 hours, the reaction mixture was further stirred for one hour at a temperature of −3° C. or lower.

The polypnet powder thus obtained was collected by filtration, washed with water, washed with acetone, and dried in vacuo at room temperature to provide 430 g of the blackish green powder of quinonediimine-phenylenediamine type electrically conductive polyaniline.

The polyaniline powder thus obtained was press-molded into a disk of 13 mm in diameter and 700 μm in thickness, and the electrical conductivity of the disk was measured by the van der Pauw's method and found to be 14 S/cm.

Production of solvent-soluble quinonediimine-phenylene-diamine type polyaniline by undoping of electrically conductive organic polymer:

To 4 liters of 2N aqueous ammonia was added 350 g of the above-obtained doped electrically conductive polyaniline powder and the mixture was stirred by an automatic homomixer at a rotation number of 5,000 r.p.m. for 5 hours. The color of the mixture was changed from blackish green to bluish purple.

The powder thus formed was collected by filtration using a Büchner funnel, washed with distilled water with stirring in a beaker until the washed solution became neutral and then washed with acetone until the washed solution became colorless. The powder was dried at room temperature in vacuo for 10 hours to provide 280 g of the blackish broken powder of undoped solvent-soluble quinonedi-imine-phenylenediamine type polyaniline.

The polyaniline obtained was soluble in N-methyl-2-pyrrolidone and the solubility thereof was 8 g in 100 g of the solvent (7.4%). Also, the intrinsic viscosity [η]of the polyaniline measured at 30° C. using the same solvent as above was 1.23 dl/g.

EXAMPLE 1

In 90 g of N-methyl-2-pyrrolidone was dissolved 1.49 g of phenylhydrazine, and 10 g of the solvent-soluble quinonediimine - phenylenediamine type polyaniline obtained in Reference Example 1 described above was dissolved in the solution with stirring. In this case, the color of the solution was changed from darkish blue to light blackish brown and at the same time, the generation of a nitrogen gas was confirmed. The solution was filtrated by a G2 filter under reduced pressure The solution of the solvent-soluble imino-p-phenylene type polyaniline thus obtained was cast on a glass plate. After smoothening the surface with a glass rod, N-methyl 2-pyrrolidone was evaporated off in a hot-blast circulating dryer, and the polyaniline film formed was peeled off from the glass plate. The thickness of the film was from 20 to 30 μm.

After immersing the film in an ethanol solution of 10% by weight of 1,5-naphthalenedisulfonic acid and 2% by weight of p-benzoquinone at room temperature for 60 minutes, the film was taken out from the solution, washed with ethanol, and dried at 60° C. for 30 minutes. The electrical conductivity of the film was measured by the van der Pouw's four terminal method ( hereinafter the same ) and found to be 0.058 S/cm.

Further, the electrical conductivity of the film after immersing the film in distilled water for 10 days was 0.017 S/cm. The electrical conductivity of the film corresponded to 29% of that of the film before the immersion

EXAMPLE 2

After immersing the polyaniline film obtained in Example 1 in a solution of 10% by weight of polyvinyl-sulfonic acid and 2.5% by weight of p-benzoquinone dissolved in a ethanol/water mixed solvent ( 1/1 by weight ratio) at room temperature for 10 minutes, the film was taken out from the solvent, washed with ethanol, and dried at 60° C. for 60 minutes. The electrical conductivity of the film was 1.4 S/cm. When the film was immersed similarly in the above solution for 60 minutes, the electrical conductivity thereof was 9.9 S/cm.

Further, when the film having the electrical conductivity of 9.9 S/cm was immersed in distilled water for 10 days, the electrical conductivity of the film was 3.5 S/cm. The electrical conductivity corresponded to 35% of that of the film before the immersion.

COMPARATIVE EXAMPLE 1

After immersing the polyaniline film obtained in Example 1 in an aqueous solution of 30% by weight of 1,5-naphthalenedisulfonic acid at room temperature for 60 minutes, the film was taken out from the solution, washed with ethanol, and dried at 60° C. for 30 minutes. The electrical conductivity of the film was $1.5 \times 10^5$ S/cm.

COMPARATIVE EXAMPLE 2

After immersing the polyaniline film obtained in Example 1 in an aqueous solution of 10% by weight of polyvinylsulfonic acid at room temperature for 30 minutes, the film was taken out from the solution, washed with ethanol, and dried at 60° C. for 30 minutes. The electrical conductivity of the film was 0.29 S/cm. When the film was similarly in the same solution for 150 minutes, the electrical conductivity thereof was 1.3 S/cm.

COMPARATIVE EXAMPLE 3

After immersing the polyaniline film obtained in Example 1 in an aqueous solution of 20% by weight of ferric nitrate at room temperature for 10 minutes, the film was taken out from the solution, washed with ethanol, and dried at 60° C. for 30 minutes. The electrical conductivity of the film was 11.6 S/cm.

Further, when the film was immersed in distilled water for 10 days, the electrical conductivity thereof was $2.3 \times 10^4$ S/cm. The electrical conductivity corresponded to 0.002% of that of the film before the immersion.

COMPARATIVE EXAMPLE 4

After immersing the polyaniline film obtained in Example 1 in an aqueous solution containing 10% by weight of methanesulfonic acid and 7.5% by weight of hydrogen peroxide at room temperature for 10 minutes, and dried at 60° C. for 30 minutes. The electrical conductivity of each film is shown in Table 1.

TABLE 1

| Example | Doping Composition | | | Doping | Electrical |
| | Oxidizing Agent (wt %) | Protonic acid (wt %) | Solvent (weight ratio) | Time (min.) | Conductivity (S/cm) |
| --- | --- | --- | --- | --- | --- |
| 4 | p-Benzoquinone (2.0) | 1,2-Ethanedisulfonic Acid (15) | Ethanol/water (1/1) | 60 | 40 |
| 5 | 1,2-Naphthoquinone (1.7) | 1,2-Ethanedisulfonic Acid (15) | N-Methylformamide/water (1/1) | 30 | 3.8 |
| 6 | 1,-Dichloro-5,6-dicyano-p-benzoquinone (2.5) | 1,2-Ethanedisulfonic Acid (15) | Ethanol/water (1/1) | 30 | 29 |
| 7 | Sodium 1,2-naphthoquinone-4-sulfonate (2.5) | 1,2-Ethanedisulfonic Acid (15) | N-Methylformamide/water (1/1) | 60 | 47 | the film was taken out from the solution, washed with ethanol, and dried at 60° C. for 30 minutes. The electrical conductivity of the film was 7.4 S/cm.

Further, when the film was immersed in distilled water for 10 days, the electrical conductivity of the film was $1.5 \times 10^3$ S/cm. The electrical conductivity corresponded to 0.02% of that of the film before the immersion.

EXAMPLE 3

The tensile strength of the undoped polyaniline film obtained in Example 1 was measured and found to be 795 kgf/cm². The tensile strength was measured using Autograph AG2000A (trade name, made by Shimazu Corporation) under the conditions of a temperature of 24° C. and a tensile rate of 50 mm/minute.

After immersing the same polyaniline film in a solution of 15% by weight of 1,2-ethanedisulfonic acid and 2% by weight of p-benzoquinone dissolved in an ethanol/water mixed solvent of 1/1 by weight ratio at room temperature for 10 minutes, the film was taken out from the solution, washed with ethanol, and dried at 60° C. for 30 minutes. The electrical conductivity of the film was 7.11 S/cm.

The tensile strength of the film was lowered to 570 kgf/cm² but the film was a tough film keeping the self-supporting property.

COMPARATIVE EXAMPLE 5

The polyaniline film obtained in Example 1 was immersed in an aqueous solution containing 15% by weight of sulfuric acid and 7.5% by weight of hydrogen peroxide at room temperature for 10 minutes. The film was taken out from the solution and tried to wash with ethanol but the film had lost the strength and was finely broken.

COMPARATIVE EXAMPLE 6

After immersing the polyaniline film obtained in Example 1 in an aqueous solution containing 10% by weight of methanesulfonic acid and 7.5% by weight of hydrogen peroxide at room temperature for 30 minutes, the film was taken out from the solution, washed with ethanol, and dried at 60° C. for 30 minutes. The electrical conductivity of the film was 21 S/cm.

The tensile strength of the film was 56 kgf/cm², which was very brittle.

EXAMPLES 4 TO 7

After immersing each of the polyaniline films obtained in Example 1 in each of the doping solutions shown in Table 1 below at room temperature, the film was taken out from the solution, washed with ethanol, and dried at 60° C. for 30 minutes. The electrical conductivity of each film is shown in Table 1.

After immersing each of the polyaniline films obtained in Example 1 in each of the doping solutions shown in Table 2 below at room temperature for 10 minutes, the film was taken out from the solution, washed with ethanol, and dried at 60° C. for 30 minutes. The electrical conductivity of each film is shown in Table 2.

TABLE 2

| Example | Doping Composition | | | Electric Conductivity (S/cm) |
| | Oxidizing Agent (wt %) | Protonic acid (wt %) | Solvent (weight ratio) | |
| --- | --- | --- | --- | --- |
| 8 | p-Benzoquinone (2.0) | 1,2-Ethanedisulfonic Acid (15) | Ethanol | $1 \times 10^3$ |
| 9 | p-Benzoquinone (2.0) | 1,2-Ethanedisulfonic Acid (15) | Ethanol/water (1/1) | 12 |
| 10 | p-Benzoquinone (2.0) | 1,2-Ethanedisulfonic Acid (15) | N-Methyl-2-pyrrolidone water (1/1) | 3.7 |

While the invention has been described in detail and with reference to specific embodiments thereof, it will be apparent to one skilled in the art that various changes and modifications can be made therein without departing from the spirit and scope thereof.

What is claimed is:

1. A process for producing an electrically conductive organic polymer which comprises contacting an organic polymer film having an imino-p-phenylene structural unit represented by the following formula:

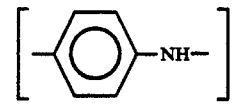

as the main repeating unit, with a doping solution consisting essentially of a quinone series oxidizing agent and an organic protonic acid.

2. The process as claimed in claim 1, wherein the organic protonic acid is a polyvalent organic acid.

3. The process as claimed in claim 1, wherein the organic protonic acid is an organic disulfonic acid.

4. The process as claimed in claim 1, wherein the organic protonic acid is a polymer acid having a sulfonic acid group or a solfuric acid group.

5. The process as claimed in claim 1, wherein the organic polymer film is soluble in an organic solvent in the undoped state and has the intrinsic viscosity [η] measured at 30° C. in N-methyl-2-pyrrolidone of at least 0.40 dl/g.

6. The process as claimed in claim 1, wherein a mixed solvent of water and an organic polar solvent is used for dissolving the quinone series oxidizing agent together with the protonic acid.

7. The process as claimed in claim 1, wherein the organic protonic acid is a halogenated polyacrylic acid.

8. The process as claimed in claim 1, wherein the doping solution consists essentially of 0.5 to 20% by weight of the quinone series oxidizing agent, and 1 to 30% by weight of the organic protonic acid.

9. The process as claimed in claim 1, wherein the doping solution consists essentially of the quinone series oxidizing agent and the organic protonic acid in a molar ratio of organic protonic acid to oxidizing agent of from 1:100 to 100:1.

10. The process as claimed in claim 1, wherein the contacting step is carried out at a temperature of at least 10° C.

11. The process as claimed in claim 10, wherein the contacting step is carried out at a temperature of 10° C. to 40° C.

12. The process as claimed in claim 1, wherein the quinone series oxidizing agent is selected from the group consisting of p-benzoquinone, o-benzoquinone, p-toluquinone, oxy-p-benzoquinone, 1,2-naphthoquinone, 1,4-naphthoquinone, diphenoquinone, stilbenequinone, chloranil, 2,3-dichloro-5,6-dicyano-p-benzoquinoen, sodium 1,2-naphthoquinone-4-sulfonate, sodium 1,4-naphthoquinone-2-sulfonate and tetrafluoro-p-benzoquinoen.

13. The process as claimed in claim 1, wherein the step of contacting the polymer film with the doping solution comprises immersing the polymer film in the doping solution.

14. The process as claimed in claim 1, wherein the step of contacting the polymer film with the doping solution comprises coating the doping solution on the polymer film.

15. The process as claimed in claim 1, wherein the step of contacting the polymer film with the doping solution comprises spraying the doping solution on the polymer film.

* * * * *